No. 855,898. PATENTED JUNE 4, 1907.
T. J. LINDSAY.
WHEEL SPINDLE AND AXLE.
APPLICATION FILED APR. 9, 1906.

3 SHEETS—SHEET 1.

Witnesses
Vernon Plummer.
Thomas W. McWew

Inventor
Thomas J Lindsay.
By
Bradford Hood
Attorneys

No. 855,898. PATENTED JUNE 4, 1907.
T. J. LINDSAY.
WHEEL SPINDLE AND AXLE.
APPLICATION FILED APR. 9, 1906.

3 SHEETS—SHEET 2.

Witnesses
Vernon Plummer
W. A. Coffman

Inventor
Thomas J. Lindsay.
By Bradford Hood
Attorneys

No. 855,898. PATENTED JUNE 4, 1907.
T. J. LINDSAY.
WHEEL SPINDLE AND AXLE.
APPLICATION FILED APR. 9, 1906.

3 SHEETS—SHEET 3.

Witnesses
Vernon Plummer
Thomas W. McMeans

Inventor
Thomas J. Lindsay
By Bradford Hood
Attorneys

UNITED STATES PATENT OFFICE.

THOMAS J. LINDSAY, OF INDIANAPOLIS, INDIANA.

WHEEL SPINDLE AND AXLE.

No. 855,898.   Specification of Letters Patent.   Patented June 4, 1907.

Application filed April 9, 1906. Serial No. 310,729.

*To all whom it may concern:*

Be it known that I, THOMAS J. LINDSAY, a citizen of the United States, residing at Indianapolis, in the county of Marion and State of Indiana, have invented certain new and useful Improvements in Wheel Spindles and Axles, of which the following is a specification.

The object of my invention is to produce a wheel spindle and axle, especially designed for the driving wheels of automobiles, the construction being such that the main portion of the axle may be made from commercial stock, such as a standard I-beam, while the spindle proper may be made from a drop forging or steel casting which may be easily machined.

A further object of my invention is to associate with my improved spindle a brake structure of such form as to be readily applied to and withdrawn from the driven member.

Figure 1:
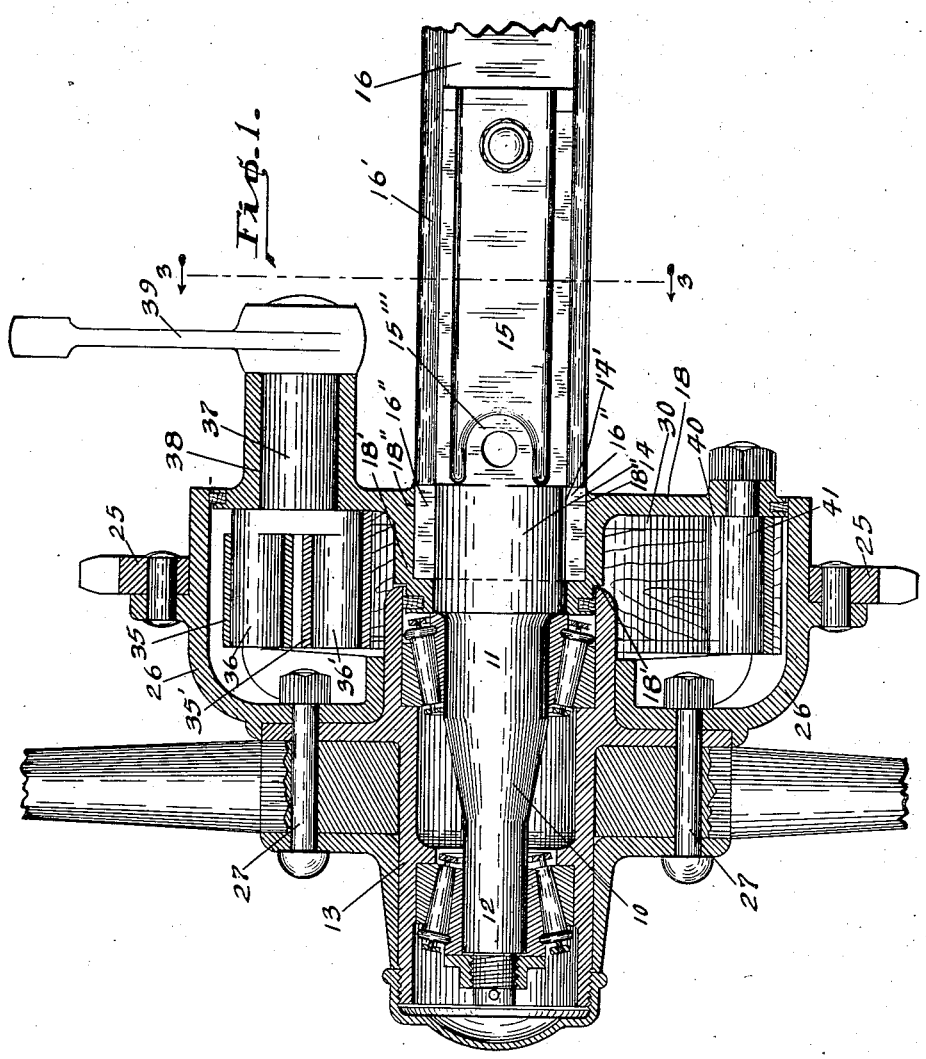
Figure 2:
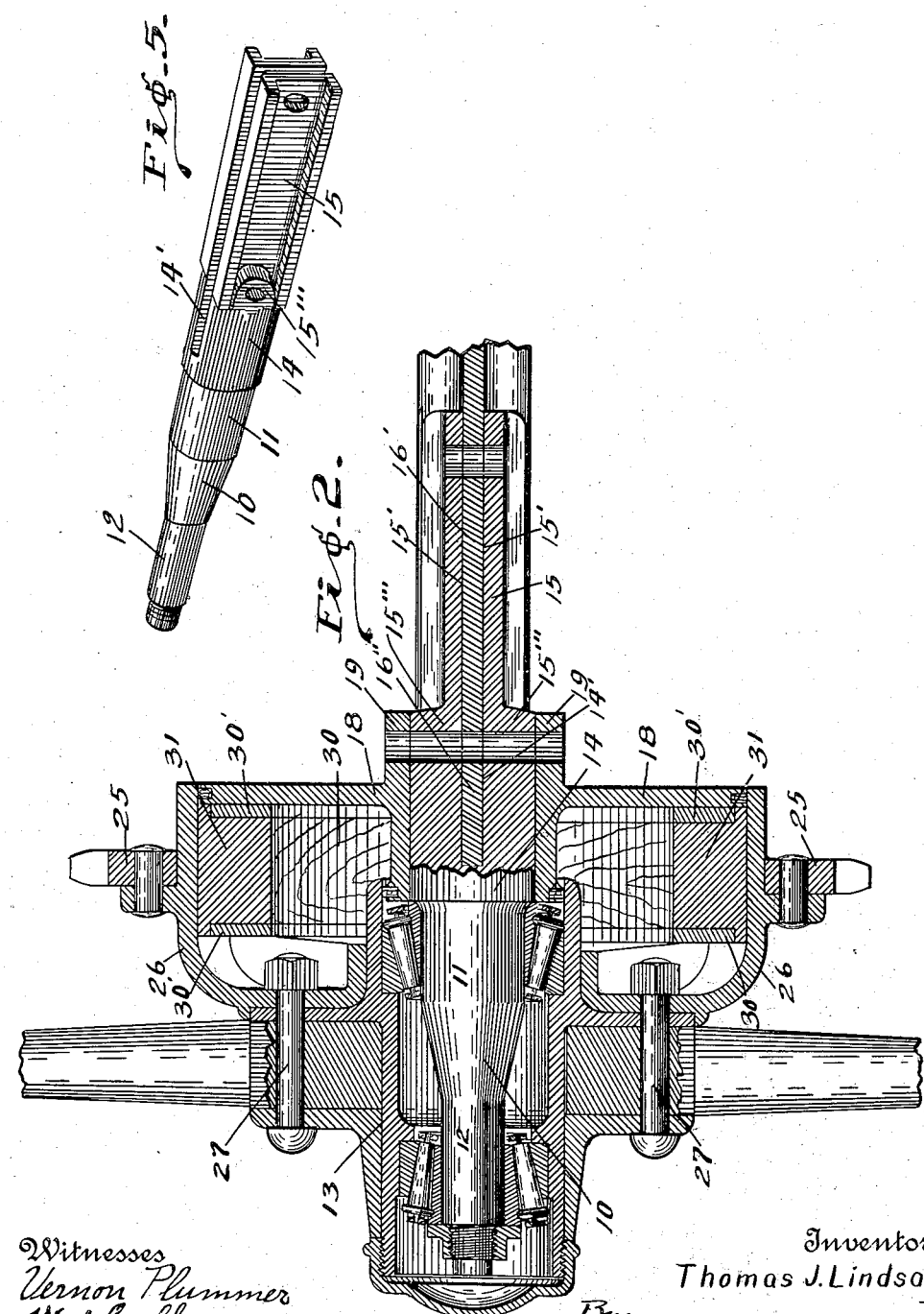
Figure 3:
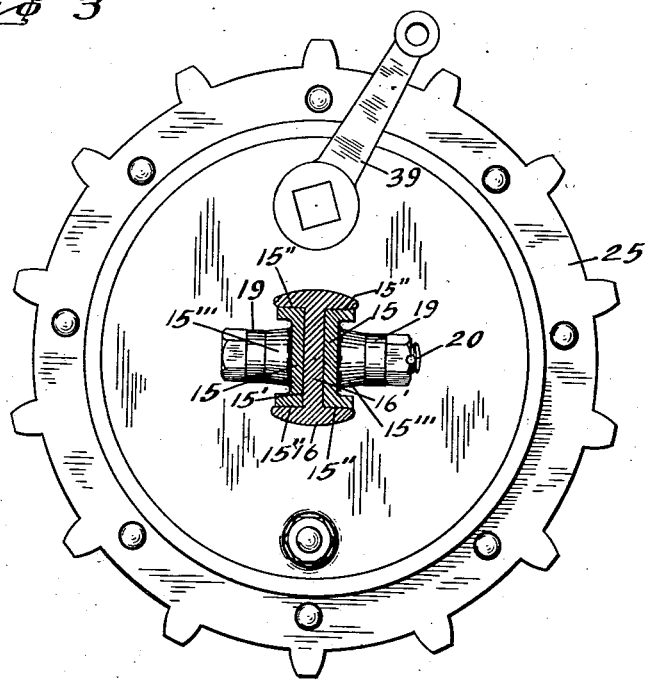

The accompanying drawings illustrate my invention:

Figure 1 is a vertical axial section of my improved spindle and brake with a driving wheel and sprocket applied thereto; Fig. 2 a section on line 2 2 of Fig. 1; Fig. 3 a section on line 3 3 of Fig. 1 on a small scale, Fig. 4 an elevation of the brake-ring support with the wheel and brake cup removed, and Fig. 5 a perspective of the spindle structure.

In the drawings, 10 indicates the spindle end provided with portions 11 and 12 adapted to receive the bearing cones of any desired form of bearing to receive the hub of a wheel 13. The spindle 10 terminates at one end in an intermediate preferably cylindrical body 14 which is diametrically slotted at 14' and each portion terminates in a finger 15. The inner faces 15' of the portions 15 form continuations of the sides of the diametrical slot 14'. The top and bottom edges 15'' of each finger 15 are also accurately machined to insure a snug fit. The flanges 16' at each end of the I-beam are stripped off so as to leave a projecting portion of the web 16'' of the I-beam, this web fitting the diametrical slot of the body 14 of the spindle and projecting radially from opposite sides of said body, as clearly shown in Fig. 1.

Fitted upon body 14 of the spindle is the hub 18' of a brake-supporting disk 18, the hub 18' being provided with keyways 18'' to receive the projecting portions of the I-beam web 16'', thus holding the brake-supporting disk 18 against rotation. In order to prevent axial displacement of the brake-supporting disk I provide said disk with a pair of ears 19 19 which project over lugs 15''' formed on each finger 15 of the spindle structure, and a bolt 20 is passed through said ears, the spindle structure and web of the I-beam axle. A second bolt 20 may be passed through fingers 15 and the web of the I-beam. The projecting portion of web 16'' may be narrowed to the diameter of the portion 14, and the ears 19 be relied upon to prevent rotation of the brake-supporting disk but I prefer the construction shown in the drawings.

The driving sprocket 25 is carried by a brake cup 26 which may be attached to the hub of wheel 13 by bolts 27 in a well known manner.

My improved brake consists of a metallic ring 30 which, in its middle portion, is slotted to form a pair of parallel, axially-separated plates 30' between which I mount the stem of a semiannular wooden block 31 which is T-shaped in cross section, the head of the T overlapping the external circumferences of the plates 30, as shown in Fig. 2.

Figure 4:
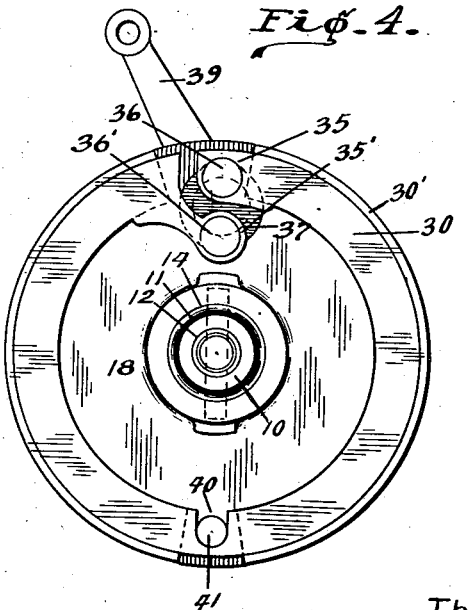

The ring 30 is split at one point and its ends overlapped, as shown in Fig. 4, and the overlapping ends are perforated by bearings 35 and 35' respectively which are preferably arranged with their axes in a plane radially of the axis of the spindle. The bearings 35 and 35' are adapted to receive the parallel pins 36 and 36' respectively which are carried by a rockshaft 37 journaled in a bearing 38 formed in disk 18. An operating lever 39 is attached to the outer end of shaft 37. Diametrically opposite the bearings 35 and 35' the ring 30 is provided with an outwardly extending slot 40 adapted to receive a pin 41 carried by disk 18.

The brake ring is entirely supported by the pins 36 and 36' and when the parts are in normal position, as shown in Fig. 4, the brake ring has all of its friction portion out of engagement with the interior of the cup 26, but when the lever 39 is moved in the direction indicated by the arrow in Fig. 4 the brake ring is expanded and will come first into engagement with the cup 26 at points near the pins 36 and 36' but, being free to shift transversely of the axis of the spindle there will be a slight movement of the ring relative to the pin 41 so that the ring will seat firmly along its entire friction surface. When the parts are returned to initial position a relative movement of the ring upon pin 41 will be in the reverse direction and the entire friction surface of the ring will be drawn away from the cup.

I claim as my invention:

1. The combination, with an I-beam axle having its web projected at the end, of a wheel spindle having a bifurcated inner end adapted to embrace the web of the axle and projected between the flanges thereof, a brake-supporting member mounted upon the spindle and provided with keyways adapted to receive the projected web of the axle, means for securing the spindle and brake-support against axial displacement, and a brake carried by said brake support.

2. The combination, with an axle structure having a medial web and overhanging flanges, of a wheel-spindle having an inner end fitted between said overhanging flanges, a brake-support mounted on the spindle, means for securing the spindle and brake-support against axial displacement, and a brake carried by said brake-support.

3. The combination, with an axle structure having a medial web and overhanging flanges, of a wheel-spindle having an inner end fitted between said overhanging flanges, and the projected end of the medial web of the axle structure projected radially from the spindle, a brake support mounted on the spindle and having a keyway adapted to receive the radially projecting portion of the axial web, means for securing the spindle and brake-support against axial displacement, and a brake carried by said brake-support.

4. The combination, with an axle structure having a medial web and overhanging flanges, of a wheel spindle having a spindle portion at one end, an intermediate body, and a pair of parallel fingers adapted to embrace the medial web of the axle structure, means for holding the spindle structure on the axle structure against longitudinal displacement, a brake-supporting member mounted on the medial portion of the spindle structure, and a brake carried by said brake-support.

5. The combination, with an axle structure having a medial web and overhanging flanges, of a wheel spindle having a spindle portion at one end, an intermediate body, and a pair of parallel fingers adapted to embrace the medial web of the axle structure and lie between the overhanging flanges of the axle structure, means for holding the spindle structure on the axle structure against longitudinal displacement, a brake-supporting member mounted on the medial portion of the spindle structure and having an ear projecting alongside one of the web embracing fingers, and a brake carried by said brake-support.

6. The combination, with an axle structure having a medial web and overhanging flanges, of a wheel spindle having a spindle portion at one end, an intermediate body, and a pair of parallel fingers adapted to embrace the medial web of the axle structure and lie between the overhanging flanges of the axle structure, means for holding the spindle structure on the axle structure against longitudinal displacement, a brake-supporting member mounted on the medial portion of the spindle structure, a brake carried by said brake-support, a rock-shaft journaled in the brake-support and provided with a pair of pins parallel with the rock-shaft, a split brake ring having its ends journaled upon said parallel pins and supported thereby, and interengaging means between the brake ring and brake-support for holding the brake ring against swing but permitting radial movement thereof.

7. The combination, with an I-beam axle structure having the flanges removed from its end to form a projecting web, of a spindle structure having a spindle at one end, an intermediate body, and a pair of parallel fingers adapted to embrace the web of the I-beam and lie between the overhanging flanges thereof, the intermediate portion of the spindle structure being slit in alinement with the space between the fingers to receive the projecting web of the I-beam; a brake-support mounted on the intermediate portion of the spindle structure, and a brake carried by said brake-support.

8. The combination, with an I-beam axle structure having the flanges removed from its end to form a projecting web, of a spindle structure having a spindle at one end, an intermediate body of less diameter than the width of the projecting web of the axle structure, and a pair of parallel fingers adapted to embrace the web of the I-beam and lie between the overhanging flanges thereof, the intermediate portion of the spindle structure and provided with keyways to receive the projecting edges of the web of the I-beam, and a brake carried by said brake-support.

9. The combination, with an I-beam axle structure having the flanges removed from its end to form a projecting web, of a spindle structure having a spindle at one end, an intermediate body, and a pair of parallel fingers adapted to embrace the web of the I-beam and lie between the overhanging flanges thereof, the intermediate portion of the spindle structure being slit in alinement with the space between the fingers to receive the projecting web of the I-beam; a brake-support mounted on the intermediate portion of the spindle structure, a rockshaft journaled in said brake support and provided on its inner end with a pair of parallel fingers, a split brake ring provided with journals in its ends adapted to receive said parallel pins, and a pin carried by the brake support and extending into a radial slot formed in the brake ring opposite the pin bearings.

10. The combination, with an I-beam axle structure having the flanges removed from its end to form a projecting web, of a spindle structure having a spindle at one end, an intermediate body of less diameter than the width of the projecting web of the axle structure, and a pair of parallel fingers adapted to embrace the web of the I-beam and lie between the overhanging flanges thereof, the intermediate portion of the spindle structure being slit in alinement with the space between the fingers to receive the projecting web of the I-beam; a brake-support mounted on the intermediate portion of the spindle structure and provided with keyways to receive the projecting edges of the web of the I-beam, a rockshaft journaled in said brake support and provided on its inner end with a pair of parallel fingers, a split brake ring provided with journals in its ends adapted to receive said parallel pins, and a pin carried by the brake support and extending into a radial slot formed in the brake ring opposite the pin bearings.

In witness whereof, I have hereunto set my hand and seal at Indianapolis, Indiana, this 6th day of April, A. D. one thousand nine hundred and six.

THOMAS J. LINDSAY. [L. S.]

Witnesses:
 ARTHUR M. HOOD,
 THOMAS W. McMEANS.